US005576840A

United States Patent [19]
Fukushima

[11] Patent Number: 5,576,840
[45] Date of Patent: Nov. 19, 1996

[54] RECORDING APPARATUS

[75] Inventor: Nobuo Fukushima, Kanagawa-ken, Japan

[73] Assignee: Canon Kabushiki Kaisha, Tokyo, Japan

[21] Appl. No.: 216,768

[22] Filed: Mar. 23, 1994

Related U.S. Application Data

[63] Continuation of Ser. No. 910,418, Jul. 8, 1992, abandoned.

[30] Foreign Application Priority Data

Jul. 18, 1991 [JP] Japan ................................ 3-178227
Jan. 30, 1992 [JP] Japan ................................ 4-015063

[51] Int. Cl.$^6$ ........................... H06N 5/76; G11B 5/00
[52] U.S. Cl. ........................ 386/46; 386/109; 386/117
[58] Field of Search ................................. 358/335, 342, 358/310, 906, 311, 207; 360/32, 33.1, 13, 14.1, 15

[56] References Cited

U.S. PATENT DOCUMENTS

| | | | |
|---|---|---|---|
| 4,885,644 | 12/1989 | Ishii et al. | 358/342 |
| 5,027,214 | 6/1991 | Fujimori | 358/209 |
| 5,032,927 | 7/1991 | Watanabe et al. | 358/335 |
| 5,067,029 | 11/1991 | Takahashi | 358/909 |
| 5,136,569 | 8/1992 | Fennema et al. | 369/58 |
| 5,159,458 | 10/1992 | Murata et al. | 358/229 |

*Primary Examiner*—Thai Q. Tran
*Assistant Examiner*—Robert Chevalier
*Attorney, Agent, or Firm*—Robin, Blecker, Daley & Driscoll

[57] ABSTRACT

A recording apparatus is arranged to detect the kind of recording medium used for recording data, and to selectively make, according to the result of detection, either a first display indicative of the absolute value of a remaining recordable capacity of the recording medium or a second display indicative of the ratio of the remaining recordable capacity to a full recordable capacity of the recording medium.

14 Claims, 6 Drawing Sheets

RECORDING APPARATUS

This is a continuation application under 37 CFR 1.62 of prior application Ser. No. 910,418, filed Jul. 8, 1992, abandoned.

BACKGROUND OF THE INVENTION

1. Field of the Invention

This invention relates to a display device, or a recording apparatus using the display device, and more particularly to a method for displaying the remaining recordable capacity of a recording medium.

2. Description of the Related Art

In the present specification, electronic cameras will be described by way of example as representing the recording apparatus having the above-stated function.

The electronic cameras include an electronic still camera which is arranged to use a 2-inch floppy disk as a recording medium and to record an image signal in the form of an analog signal on the floppy disk.

The maximum number of pictures recordable per disk by the electronic still camera is about 50. Accordingly, the number of taken pictures is displayed in an integral value.

Meanwhile, a digital camera of the kind arranged to have an image signal outputted from an image sensor recorded in the form of a digital signal on a memory card which is a semiconductor recording medium or on a hard disk or the like has come to be considered of late. Further, an IC adapted for a process of compressing the digital image signal has been developed. Therefore, if the digital image signals are stored on a hard disk or the like in a compressed state, more than 100 pictures can be recorded on a single sheet of hard disk.

If, for example, it becomes possible to record 1000, 10000 or more pictures on one recording medium with ICs for a high rate of compression becoming available and with a higher rate of integration of semiconductors becoming possible, the conventional display method causes an increase in size of a display panel as it would become necessary to arrange display segments for three, four or five digits. If the size of the display panel is to be left unchanged, the size of display characters would become too small for easy visual discernment. Besides, it is another problem that the large number of pictures such as hundreds is not easily perceptible by the photographer.

Further, some of known compression processing methods includes a compression mode in which the amount of data required to record one picture after compression is variable according to the taken image. In a case where an image is to be recorded in such a compression mode, the number of remaining recordable pictures is displayed as an approximate reference.

In such a case, therefore, even if the number of remaining recordable pictures is displayed, for example, as five, the number of actually recordable pictures might be only three depending on the taken images. It is, therefore, difficult for the photographer to accurately know the actual number of remaining recordable pictures.

SUMMARY OF THE INVENTION

This invention is directed to the solution of the above-stated problems of the prior art. Therefore, it is a principal object of the invention to provide a recording apparatus which is capable of making a clearly visually perceptible and discernible display without increasing the size of a display part for displaying the remaining recordable capacity of a recording medium and thus without increasing a space for the display part.

To attain this object, a recording apparatus arranged as an embodiment of the invention comprises detection means for detecting the kind of recording medium to be used for recording data; and display means for selectively making, according to an output of the detection means, either a first display indicative of the absolute amount of a remaining recordable capacity of the recording medium or a second display indicative of the ratio of the remaining recordable capacity to a full recordable capacity of the recording medium.

Other objects and advantages of the invention will become apparent from the following detailed description of embodiments thereof taken in conjunction with the accompanying drawings.

DETAILED DESCRIPTION OF THE PREFERRED EMBODIMENTS

Figure 1:
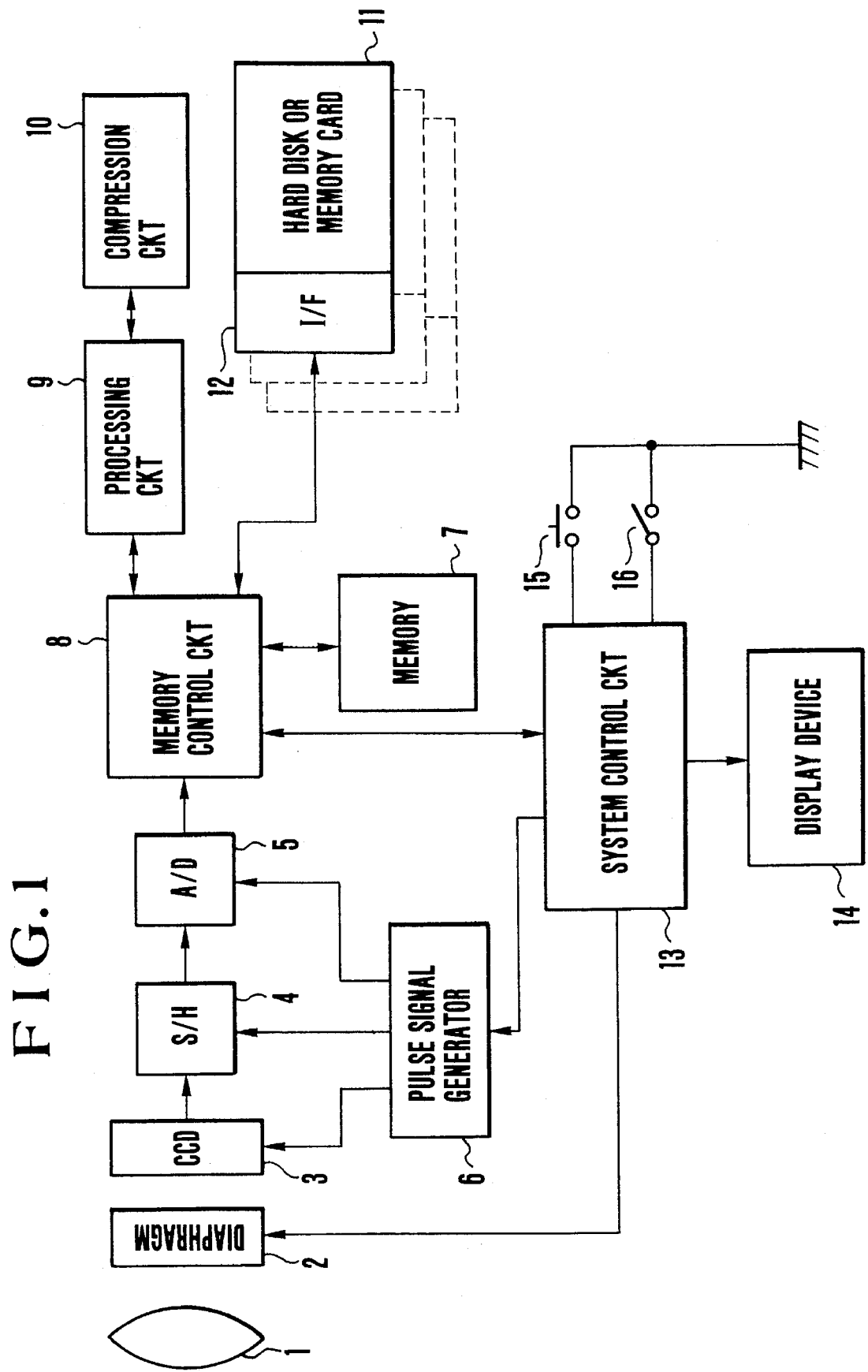
FIG. 1 is a block diagram showing the arrangement of an electronic camera to which the invention is applied.

The following describes a first embodiment of the invention: FIG. 1 shows in a block diagram an electronic camera to which the invention is applied. Referring to FIG. 1, the electronic camera includes a picture-taking optical system 1; an exposure control part 2 arranged to control a diaphragm or the like; a solid-state image sensor 3 which is a CCD or the like; a sample-and-hold (hereinafter referred to as S/H) circuit 4; an A/D conversion circuit 5 for converting an analog signal into a digital signal; a pulse signal generator 6 arranged to generate a timing signal for driving the solid-state image sensor 3, a sample-and-hold pulse signal for the S/H circuit 4 and an A/D conversion pulse signal for the A/D conversion circuit 5; an internal memory 7; and a memory control circuit 8 arranged to control reading and writing actions of the memory 7 and a refreshing action of a DRAM.

A processing circuit 9 is arranged to form a luminance signal and color-difference signals from an image signal outputted from the CCD (image sensor) 3. A compression circuit 10 is arranged to compress the amount of data of the luminance signal and the color-difference signals. A recording medium 11 is either a hard disk device or a memory card which is used for recording and storing image data and is arranged to be demountably mounted on the camera body. An interface (I/F) circuit 12 is interposed in between the camera body and the recording medium 11. A system control circuit 13 is arranged to control the system of a sequence of picture-taking processes, etc. A display device 14 is arranged to make a liquid crystal display or the like in such a way as to inform the photographer of the conditions of the camera, such as the number of recordable pictures, the amount of remaining battery power and so on. A reference numeral 15 denotes a recording trigger switch (or a shooting switch). A switch 16 is provided for selection of a recording mode. The taken image data is recorded on the recording medium 11 in a variable-length compression mode if the switch 16 is on and in a fixed-length compression mode if the switch 16 is off.

Incidentally, a plurality of recording media 11 are mountable on the single camera body. However, for the sake of simplification of illustration, only one recording medium 11 is assumed to be mounted on the camera body.

Figure 2:
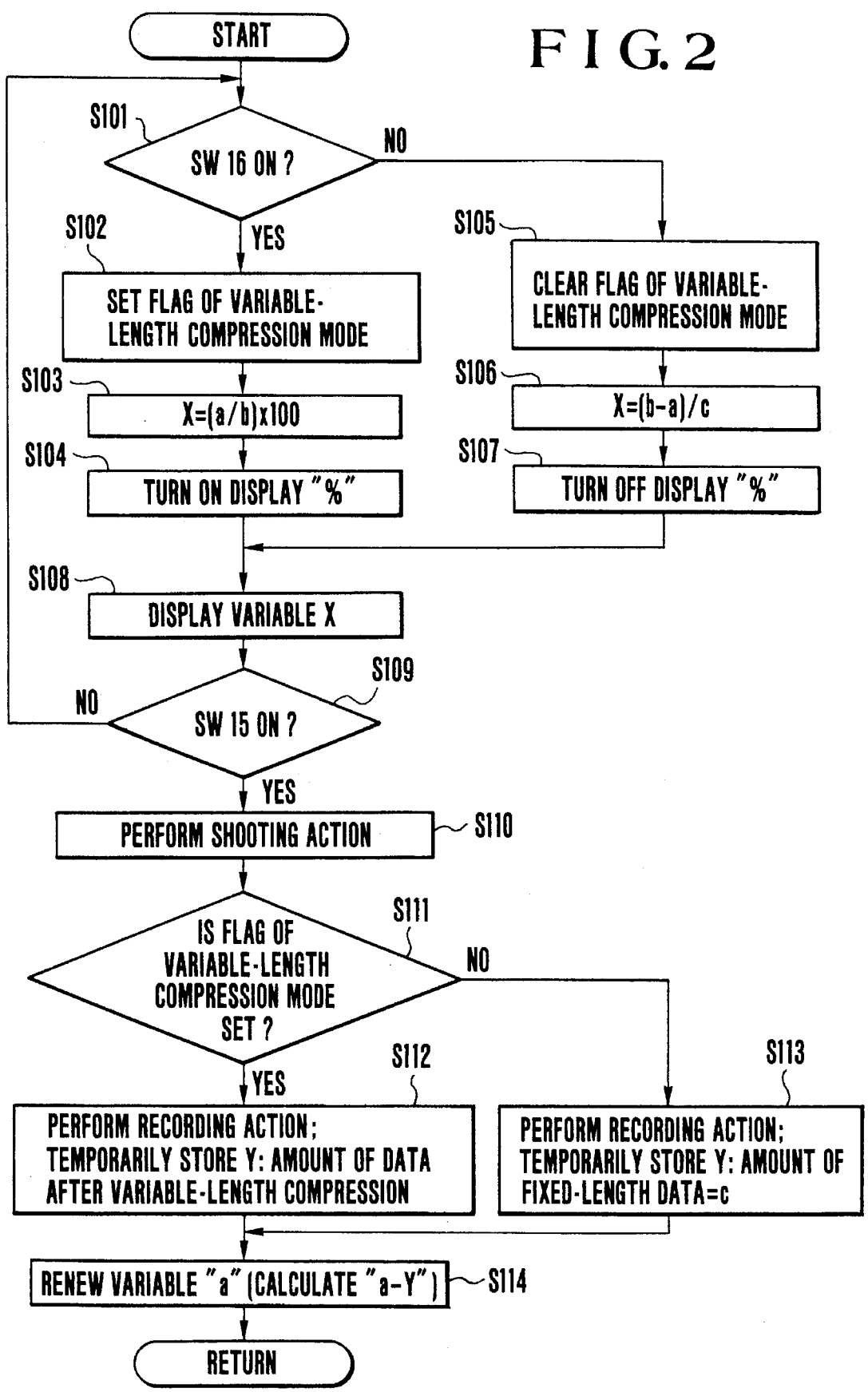
FIG. 2 is a flow chart showing the sequence of picture-taking processes of a first embodiment of the invention.

The picture-taking sequential control, mainly the control over the display action of the display device 14, of the recording apparatus which is arranged as described above is described below with reference to FIG. 2 which is a flow chart:

Referring to FIG. 2, when a main power supply which is not shown is turned on, the remaining storable capacity "a" and the maximum storable capacity "b" of the recording medium 11 are read out to be temporarily stored. After this action, the flow of control starts.

At a step S101, a check is made to find if the switch 16 is on. If so, the flow proceeds to a step S102. At the step S102, a flag indicating that the recording mode is a variable-length compression mode is set. The flow proceeds to a step S103. At the step S103, the following arithmetic operation is performed to obtain a variable X:

X=a/b×100 - - - wherein "a" represents a variable indicative of the remaining storable capacity of the recording medium 11, and "b" represents a variable indicative of the maximum storable capacity of the recording medium 11.

In other words, the ratio (a percentage) of the remaining storable capacity to the maximum storable capacity of the recording medium 11 is obtained in the step S103. The flow then proceeds to a step S104. At the step S104, the display device 14 is caused to display the segment "%".

Meanwhile, if the switch 16 is found to be off at the step S101, the flow comes to a step S105. At the step S105, the flag indicative of the variable-length compression mode is cleared to cause the camera to recognize that the recording mode is a fixed-length compression mode. The flow proceeds to a step S106. At the step S106, a variable X is obtained by performing an arithmetic operation in the following manner:

X=(b−a)/c - - - wherein "c" represents the amount of data required to record one picture (fixed-length data) and "a" and "b" are the same variables as those used at the step S103.

In other words, the number of remaining recordable pictures on the recording medium 11 is obtained at the step S106. The flow proceeds to a step S107. At the step S107, the segment "%" of the display device 14 is turned off to make no display of "%". At a step S108, the display device 14 is caused to display the value X obtained in the step S103 or the step S106.

Figure 3A:
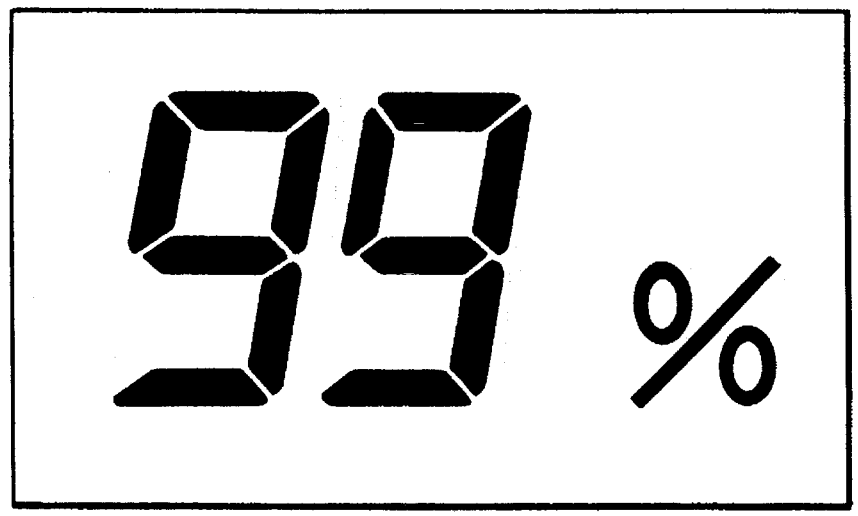
FIGS. 3(a) and 3(b) show, by way of example, displays made by display devices of the first and second embodiments of the invention.
Figure 3B:
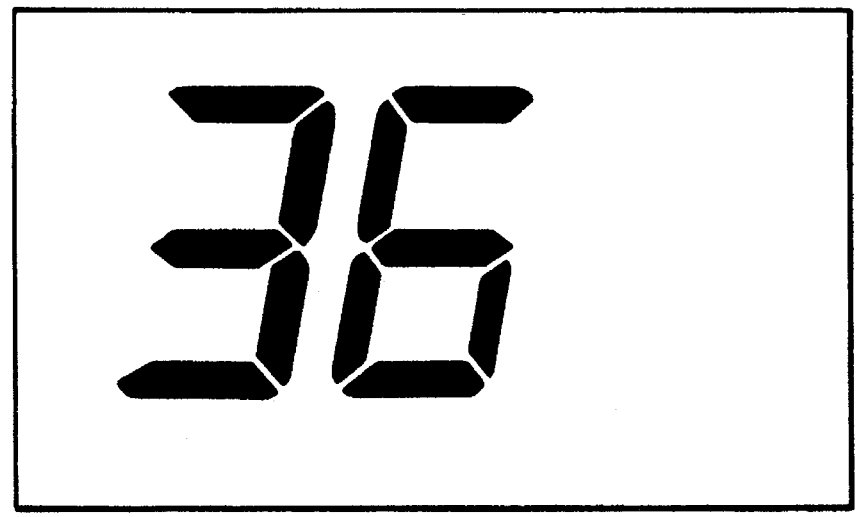

FIGS. 3 (a) and 3 (b) show, by way of example, the displays of the value X. The display shown in FIG. 3(a) is made in the variable-length compression mode and the display shown in FIG. 3(b) in the fixed-length compression mode. The flow proceeds to a step S109. Step S109: A check is made to find if the shooting switch 15 has been pushed. If not, the flow comes back to the step S101. If the switch 15 is found to have been pushed, the flow proceeds to a step S110.

Step S110: Shooting and recording actions are performed. More specifically, an exposure is made on the image sensor 3 by controlling the exposure control part 2, and optical information thus obtained is converted into an electrical signal by the image sensor 3. The electrical signal thus obtained is converted into a digital signal by the A/D conversion circuit 5. The digital signal is supplied to the memory control circuit 8 to be temporarily stored in the memory 7. The flow comes to a step S111.

Step S111: A check is made for the recording-mode flag which has already been set at the previous step. If the flag indicates the variable-length compression mode, the flow proceeds to a step S112. At the step S112, the image signal is read out from the memory 7 to be subjected to a given process at the processing circuit 9. The output of the processing circuit 9 is supplied to the compression circuit 10. The compression circuit 9 then performs a variable-length compression process on the signal according to the taken image.

The manner in which the above-stated compression process is performed does not relate directly to this invention. However, this process is briefly described by way of example as follows: the image data is divided into a luminance signal and color-difference signals. These image data are divided into frequency components for every area of the picture and are encoded by a DCT (discrete cosine transform) action or the like. The encoded image data are transferred to the recording medium 11 to be recorded thereon.

Further, data Y which represents the amount of image data obtained after the variable-length compression process is temporarily stored on the side of the camera.

If the recording-mode flag is found to indicate the fixed-length compression mode at the step S111, the flow comes to a step S113. At the step S113, the image signal is divided into a luminance signal and color-difference signals by the processing circuit 9. After that, the compression circuit 10 is controlled and caused to perform a fixed-length compression process irrespectively of the taken image. Compressed image data thus obtained is transferred to and recorded on the recording medium 11.

The amount Y of the compressed data is temporarily stored on the side of the camera. In the case of the fixed-length compression mode, the amount Y (which is equal to the amount "c" of data of fixed length) is a fixed value already stored on the side of the camera.

At a step S114, "a−Y" is calculated. In other words, an arithmetic operation is performed to find the remaining storable capacity of the recording medium after taking a shot. The variable "a" which is to be used for the steps S103 and S106 is renewed into the latest value.

One round of the picture-taking sequence comes to an end upon completion of the step S114. The flow then comes back to the step S101 for a next round of the picture-taking operation.

The following describes a second embodiment of the invention: an electronic camera in the second embodiment is arranged in the same manner as the arrangement shown in FIG. 1, except that the switch 16 is provided for making a discrimination between different kinds of recording medium 11. The switch 16 is on when the camera body is loaded with a hard disk device and is off when the camera body is loaded with a memory card.

Figure 4:
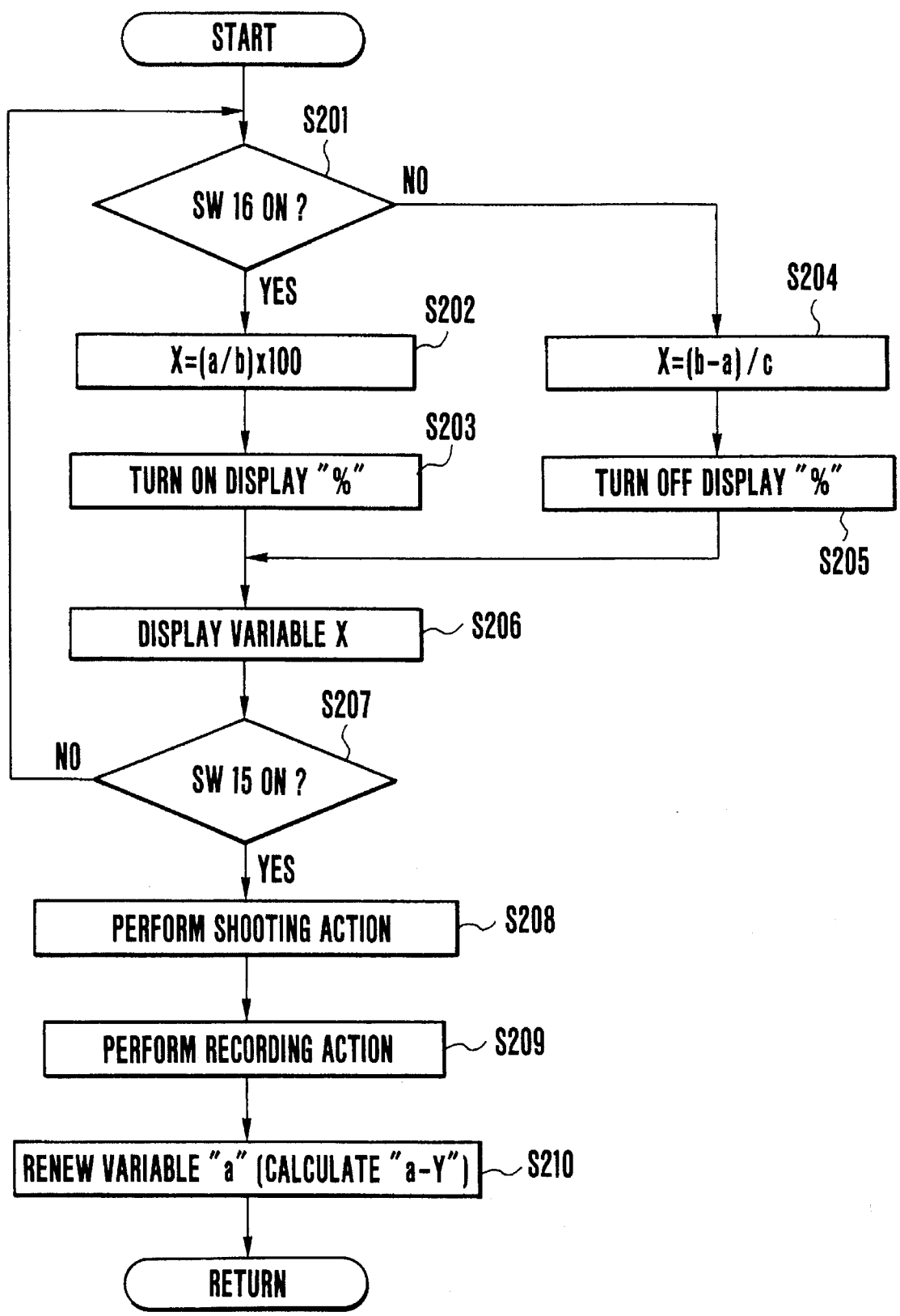
FIG. 4 is a flow chart showing a sequence of picture-taking processes of the second embodiment of the invention.

With the electronic camera in the second embodiment of the invention arranged in this manner, the picture-taking sequence control, mainly the control over the display action of the display device 14, of the electronic camera is performed as described below with reference to FIG. 4, which is a flow chart:

Referring to FIG. 4, with a main power supply (not shown) turned on, the remaining storable capacity and the maximum storable capacity of the recording medium 11 are read out to be temporarily stored. The flow of control starts. At a step S201, a check is made to find if the switch 16 is on, that is, to find if the recording medium 11 is a hard disk device. If the switch 16 is found to be on, the flow proceeds to a step S202. At the step S202, the following arithmetic operation is performed to obtain a variable X:

X=a/b×100 wherein "a" represents a variable indicative of the remaining storable capacity of the recording medium 11, and "b" represents a variable indicative of the maximum storable capacity of the recording medium 11.

In other words, the ratio (a percentage) of the remaining storable capacity of the recording medium 11 to the maximum storable capacity of the recording medium 11 is obtained at the step S202. Next, the flow proceeds to a step S203. At the step S203, the display device 14 is caused to display the segment "%".

Meanwhile, if the switch 16 is not found on at the step S201, i.e., if the recording medium 11 is a memory card, the flow comes to a step S204. At the step S204, the following arithmetic operation is performed to obtain a variable X:

X=(b−a)/c - - - wherein "c" represents the amount of data required to record one picture (fixed-length data) and "a" and "b" are the same variables as those used at the step S202.

The number of remaining recordable pictures on the recording medium 11 is thus obtained at the step S204. The flow then proceeds to a step S205. At the step S205, the segment "%" of the display device 14 is turned off to make no display of "%". The flow then comes to a step S206.

Step S206: The display device 14 is caused to display the variable X which has been obtained in the step S202 or S204. This display is made, for example, as shown in FIGS. 3(a) or 3(b). The display of FIG. 3(a) is made when the recording medium 11 is a hard disk device while that of FIG. 3(b) is made when the recording medium 11 is a memory card. The flow then proceeds to a step S207.

Step S207: A check is made to find if the shooting switch 15 has been pushed. If not, the flow comes back to the step S201. If so, the flow proceeds to a step S208. At the step S208, shooting and recording actions are performed. More specifically, an exposure is made on the image sensor 3 by controlling the exposure control part 2. The image sensor 3 then converts optical information-into an electrical signal. The electrical signal is converted into a digital signal by the A/D conversion circuit 5. The digital signal is supplied to the memory control circuit 8 to be temporarily stored in the memory 7. At a step S209, the image signal which is outputted from the image sensor and is converted into a digital form by the A/D conversion circuit 5 is recorded on the recording medium 11. Before recording on the recording medium 11, the image signal may be either divided into a luminance signal and color-difference signals or subjected to a compression process at the compression circuit 10. After the recording action, the flow comes to a step S210.

Step S210: The amount "Y" of data required to record one picture is subtracted from the remaining storable capacity "a" of the recording medium 11 mentioned in the foregoing, that is, "a−Y" is calculated. In other words, the remaining storable capacity of the recording medium 11 after the recording action is calculated to renew the variable "a" to be used at the step S202 or S204. Upon completion of the renewal of the variable "a", one round of the picture-taking sequence comes to an end, and the flow comes back to the step S201 for a next round.

Figure 5:
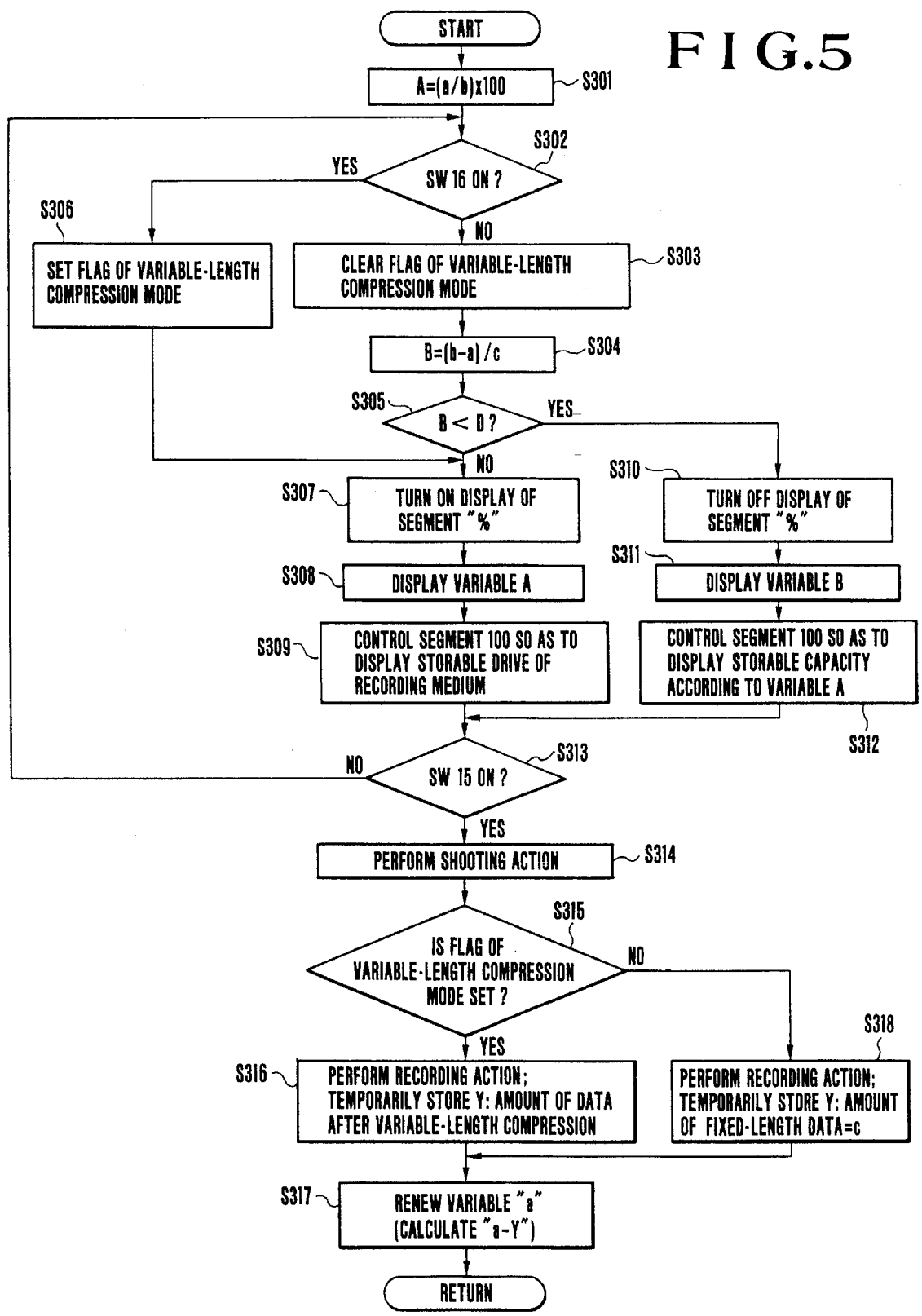
FIG. 5 is a flow chart showing a sequence of picture-taking processes of a third embodiment of the invention.

A third embodiment of the invention is described as follows: an electronic camera according to the third embodiment of the invention is arranged in the same manner as FIG. 1 which shows the first embodiment, except for the method for making a display at the display device 14. The details of the display method will become apparent from the following description of the flow of a control operation given with reference to FIG. 5:

FIG. 5 shows, in a flow chart, the control over the sequence of picture-taking processes (mainly the control over the display action of the display device 14) of the electronic camera in the third embodiment. When the main power supply (not shown) of the electronic camera is turned on, the remaining storable capacity "a" and the maximum storable capacity "b" of the recording medium 11 are read out to be temporarily stored. The flow of the control operation starts. At a step S301, the following arithmetic operation is performed to obtain a variable A:

A=(a/b)×100 - - - wherein "a" represents a variable indicative of the remaining storable capacity of the recording medium 11 and "b" represents a variable indicative of the maximum storable capacity of the recording medium 11.

In other words, the ratio (a percentage) of the remaining storable capacity to the maximum storable capacity of the recording medium 11 is obtained at the step S301. The flow proceeds to a step S302. At the step S302, a check is made to find if the switch 16 is on. If so, the flow comes to a step S306. At the step 306, a flag indicative of the variable-length compression mode is set to cause the camera to recognize that the recording mode as set is the variable-length compression mode. The flow then proceeds to a step S307.

Meanwhile, if the switch 16 is found to be not on at the step S302, the flow proceeds to a step S303. At the step S303, the flag indicative of the variable-length compression mode is cleared to cause the camera to recognize that the recording mode as set is the fixed-length compression mode. The flow then proceeds to a step S304.

Step S304: A variable B is obtained by carrying out the following arithmetic operation:

B=(b−a)/c - - - wherein "c" represents the amount of data (the amount of data of fixed length) required to record one picture and "a" and "b" are the same variables as those used at the step S301.

In other words, the number of remaining recordable pictures on the recording medium 11 is obtained in the step S304. The flow proceeds to a step S305. At the step S305, the number B of remaining recordable pictures obtained in the step S304 is compared with a given value D. The given value D is a value which has previously been set on the side of the camera at such a value that is readily perceptible by the photographer in displaying the number of remaining recordable pictures on the recording medium 11.

If the variable B is found to be not smaller than the given value D at the step S305, the flow comes to a step S307. At the step S307, the display device 14 is caused to display the segment "%". The flow then proceeds to a step S308. At the step S308, the display device 14 is caused to display the value A obtained in the step S301. The flow proceeds to a step S309. At the step S309, the display mode of a segment 100 of the display device 14 (see FIGS. 6(a) and 6(b)) is changed over to the display of storable drives of the recording medium. An example of such a display is shown in FIG. 6(a).

Figure 6B:
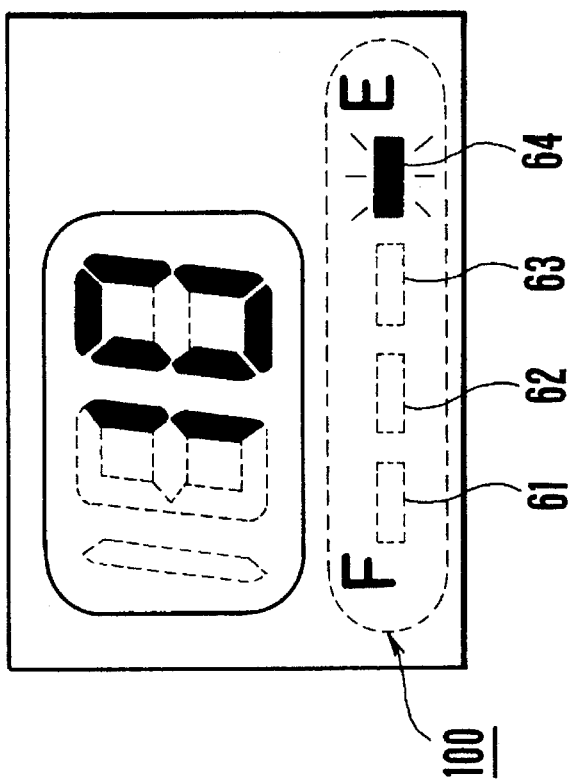
FIGS. 6(a) and 6(b) show, by way of example, displays made by a display device of the third embodiment of the invention.
Figure 6A:
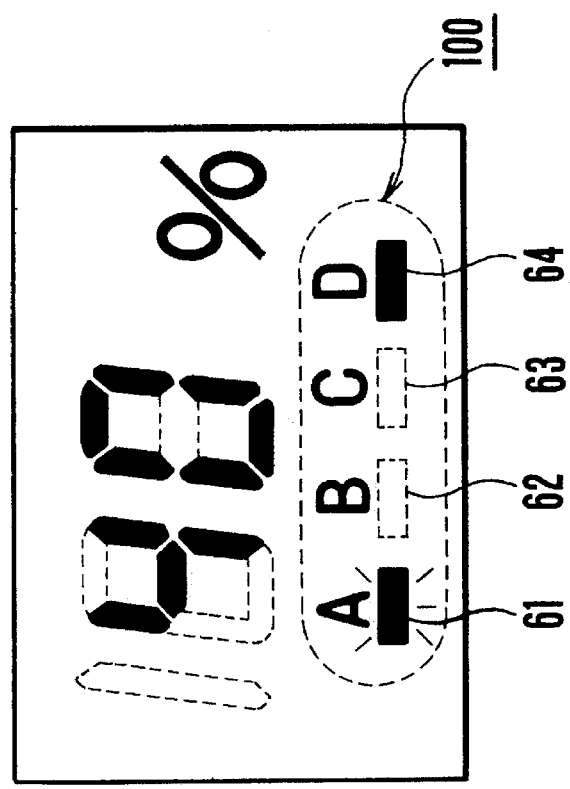

In the case of FIG. 6(a), a percentage of the remaining storable capacity on the recording medium is displayed, while storable areas of drives of the recording medium are displayed by using the segment 100.

More specifically, assuming that the recording medium 11 mounted on the camera is a hard disk, in this embodiment, the hard disk is divided, for example, into four drives (drive areas). The term "drives" as used herein means either physical drives indicating a plurality of disks mountable on the camera or theoretical drive areas obtained by dividing a single disk.

With the four drives assumed to be A, B, C and D, the drives A, B, C and D correspond to segments 61, 62, 63 and 64, respectively. Among the segments 61 to 64, any segment that is lit up indicates an unrecordable drive and any segment that is put out indicates a recordable drive. In a case where a segment is blinking, the blinking segment indicates that the drive corresponding to the segment is being selected and data is being written into the drive. Selection of the drives is performed by the operation of a switch, etc.

Again referring to the flow chart of FIG. 5, if the value B obtained in the step S304 is found to be smaller than the given value D at the step S305, the flow comes to a step S310. At the step S310, the segment "%" of the display device 14 is turned off. The flow proceeds to a step S311. At the step S311, the display device 14 is caused to display the value B obtained in the step S304. The flow then proceeds to a step S312. At the step S312, the display mode of the segment 100 is changed over to the display of the remaining storable capacity corresponding to the variable A. An example of this display is shown in FIG. 6(b).

In the case of FIG. 6(b), the number of remaining storable pictures on the recording medium is displayed, while the remaining storable capacity of the recording medium is also displayed by using the segment 100.

When displaying the number of remaining storable pictures, a display is made by encompassing the value with a frame segment to prevent the display from being mistaken for the "%" display mentioned in the foregoing.

For example, the displays of "A", "B", "C" and "D" which are shown in FIG. 6(a) is put out, and "F" (full) and "E" (empty) are displayed as shown in FIG. 6(b). In this instance, if all the segments 61, 62, 63 and 64 are lit up, the display shows that the remaining storable capacity is between 75% and 100%. If three segments 62, 63 and 64 are lit up, the display indicates that the remaining storable capacity is between 50% and 75%. If two segments 63 and 64 are lit up, the display indicates that the remaining storable capacity is between 25% and 50%. When the remaining storable capacity becomes less than 25%, the segment 64 is caused to blink to warn the photographer that the remaining storable capacity of the recording medium is small.

In the case of the display shown in FIG. 6(b), the number of remaining recordable pictures on the recording medium 11 is 10, while the remaining storable capacity is less than 25% of the full storable capacity of the recording medium 11. In this case, therefore, the segment 64 blinks to warn the photographer of the small remaining recordable capacity of the recording medium 11.

Coming back to the flow chart of FIG. 5, a check is made at a step S313 to find if the shooting switch 15 has been pushed. If not, the flow comes back to the step S302. If so, the flow proceeds to a step S314.

Step S314: Shooting and recording actions are performed. More specifically, an exposure is made on the image sensor 3 by controlling the exposure control part 2 and, then, optical information thus obtained is converted into an electrical signal by the image sensor 3. The electrical signal is converted into a digital signal by the A/D conversion circuit 5. The digital signal is then temporarily stored in the memory 7.

Step S315: The recording-mode flag which has already been set at the previous step is checked. If the flag indicates the variable-length compression mode, the flow proceeds to a step S316. At the step S316, the image signal stored in the memory 7 is read out and processed in a predetermined manner by the processing circuit 9. The signal thus processed is supplied to the compression circuit 10 to be subjected to a variable-length compression process according to the taken image. The image data thus compressed is transferred to the recording medium 11 to be recorded thereon. The amount Y of the variable-length compressed data is temporarily stored on the side of the camera.

Meanwhile, if the recording-mode flag is found to indicate the fixed-length compression mode at the step S315, the flow comes to a step S318. At the step S318, the processing circuit 9 divides the image signal into a luminance signal and color-difference signals. After that, the compression circuit 10 is controlled and caused to perform a fixed-length compressing process in such a way as to compress the image data irrespectively of the taken image. The image data thus compressed is transferred to and recorded on the recording medium 11.

The amount Y of the compressed data is stored temporarily on the side of the camera. In the case of the fixed-length compression mode, the amount Y which is equal to the amount "c" of fixed-length data is of a fixed value which has already been stored on the camera side.

At a next step S317, "a–Y" is calculated. In other words, the remaining storable capacity of the recording medium 11 after the image picture-taking action is calculated to renew the variable "a" which is to be used at the step S301 or S304. Upon completion of the step S317, one round of the sequence of picture-taking processes comes to an end, and the flow comes back to the step S301 for another round of the picture-taking processes.

In accordance with this invention, as described above, the recording apparatus is provided with detection means for detecting the kind of a recording medium, and display means for selectively making, according to an output of the detection means, either a first display indicative of the absolute value of a remaining recordable capacity of the recording medium or a second display indicative of the ratio of the remaining recordable capacity to a full recordable capacity of the recording medium. The invented arrangement enables the recording apparatus to be capable of making a highly visually discernible display without necessitating any increase in size of the display panel irrespective as to whether the capacity of the recording medium to be used is relatively small or relatively large.

Further the recording apparatus according to this invention is provided with data amount converting means for converting the amount of data of input information, and display means for making a display related to a remaining recordable capacity of the recording medium. The data amount converting means has a first mode in which the amount of data of information after being converted is set at a fixed value irrespectively of the input information; and a second mode in which the amount of data of information after being converted is variable according to the input information. In the first mode, the display means is caused to display the absolute value of the remaining recordable capacity of the recording medium. In the second mode, the display means is caused to display the ratio of the remaining recordable capacity to a full recordable capacity of the recording medium. The display is thus arranged to be made in an optimum manner for the form and state of the data to be recorded on the recording medium, so that a highly visually discernible display can be made by the recording apparatus.

While some of the preferred embodiments of this invention have been described, the invention is not limited to these embodiments but may be variously embodied without departing from the spirit and the essential features thereof.

For example, in the case of the second embodiment, the remaining recordable capacity of the recording medium 11 is displayed in the percentage when a hard disk device is used as the recording medium 11, and in the number of pictures when a memory card is used as the recording medium 11. However, the display in the number of pictures may be changed to the display in the percentage according to the kind (the full storable capacity) of memory card.

Further, with respect to the second embodiment, the on-off control over the switch 16 which is provided for a discrimination between the different kinds of the recording medium 11 may be changed to be automatically determined and performed by the system control circuit 13.

Further in third embodiment, a percentage display and a display showing the recordable drives of the recording medium are made. This arrangement may be changed to display the number of remaining recordable pictures and the recordable drives on the recording medium. Further, with respect to the third embodiment, the display segment 100 is arranged to blink for warning the photographer. However, this arrangement may be changed to cause the applicable figure to blink or to discretely give a warning within the viewfinder of the camera or to make a warning sound.

Further, it is apparent that this invention can be applied to a case where the fixed-length compression mode adopted in the above-stated embodiments is replaced with a non-compression (fixed-length data) mode in which input information is directly recorded without being compressed.

In other words, the foregoing description of embodiments has been given for illustrative purposes only and not to be construed as imposing any limitation in every respect.

The scope of the invention is, therefore, to be determined solely by the following claims and not limited by the text of the specifications, and alterations made within a scope equivalent to the scope of the claims fall within the true spirit and scope of the invention.

What is claimed is:

1. A recording apparatus, comprising:
   a) recording means for recording data;
   b) switching means for selectively switching a mode between a first mode for recording the data on a first medium having a relatively small storing capacity and a second mode for recording the data on a second medium having a relatively large storing capacity;
   c) display means; and
   d) control means associated with said switching means and arranged to cause the display means to display a remaining storing capacity by a unit number of storable data in the first mode and to display a remaining storing capacity by a proportion of storable data and the whole storing capacity of said second medium in the second mode.

2. An apparatus according to claim 1, wherein said data is image data.

3. An apparatus according to claim 2, wherein said control means is arranged to display how many frames of the image data can be recorded by the unit number of storable data in the first mode.

4. An apparatus according to claim 2, wherein said control means is arranged to display the remaining storing capacity relative to the whole storing capacity of the second medium by a percentage value in the second mode.

5. An apparatus according to claim 1, wherein the first medium and the second medium can be selectively loaded on the recording means.

6. An apparatus according to claim 5, further comprising detecting means for detecting the fact that either the first or second medium has been loaded on the recording medium.

7. A recording apparatus, comprising:
   a) data recording means;
   b) variable data compression means operable for compressing data in a variable data compression rate based on a data condition;
   c) switch means for selectively causing said variable data compression means to operate;
   d) display means; and
   e) control means for causing said display means to indicate a relative storable capacity by a proportion of storable data and the whole storing capacity of a storable medium when said switch means causes said variable data compression means to operate and to indicate absolute storage capacity by a unit number of storable data when said switch means does not cause said variable data compression means to operate.

8. A recording apparatus according to claim 7, wherein said data is image data.

9. A recording apparatus according to claim 8, wherein said control means is arranged to display on said display means how many frames of the image data can be recorded by the absolute value when said switch means does not cause said variable data compression means to operate.

10. A recording apparatus according to claim 8, wherein said control means is arranged to display the remaining storing capacity relative to the whole storing capacity by the relative value when said switch means causes said variable data compression means to operate.

11. A recording apparatus for recording on a recording medium, comprising:
    a) data recording means;
    b) detecting means for detecting whether a remaining storing capacity of said recording medium is relatively larger or smaller than a predetermined value and for outputting a first mode signal when the remaining storing capacity is smaller than said predetermined value and for outputting a second mode signal when the remaining storing capacity is larger than said predetermined value; and
    c) display means responsive to outputs of said detecting means for making a display indicative of the absolute value of the remaining storing capacity of said recording medium by indicating a unit number of storable data when the first mode signal is output and for making a display indicative of the relative value of the remaining storing capacity of said recording medium by indicating a proportion of storable data and the whole storing capacity of the recording medium when the second mode signal is output.

12. A recording apparatus according to claim 11, wherein said data is image data.

13. A recording apparatus according to claim 12, wherein said display means is arranged to display how many frames of the image data can be recorded by the absolute value when said first mode signal is output.

14. A recording apparatus according to claim 12, wherein said display means is arranged to display the remaining storing capacity relative to the whole storing capacity by indicating a percentage value when said second mode signal is output.

* * * * *